Feb. 3, 1970     R. W. SEBASTIAN     3,493,830
SEEKING SWITCH SERVOCONTROL INCLUDING A UNIQUE COMMUTATOR
Filed May 3, 1967     2 Sheets-Sheet 1
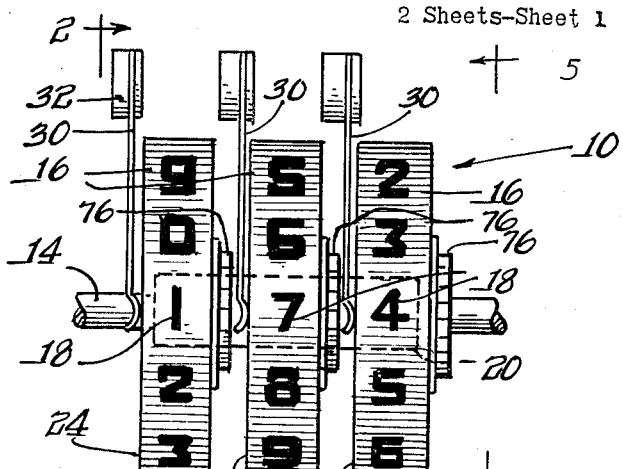
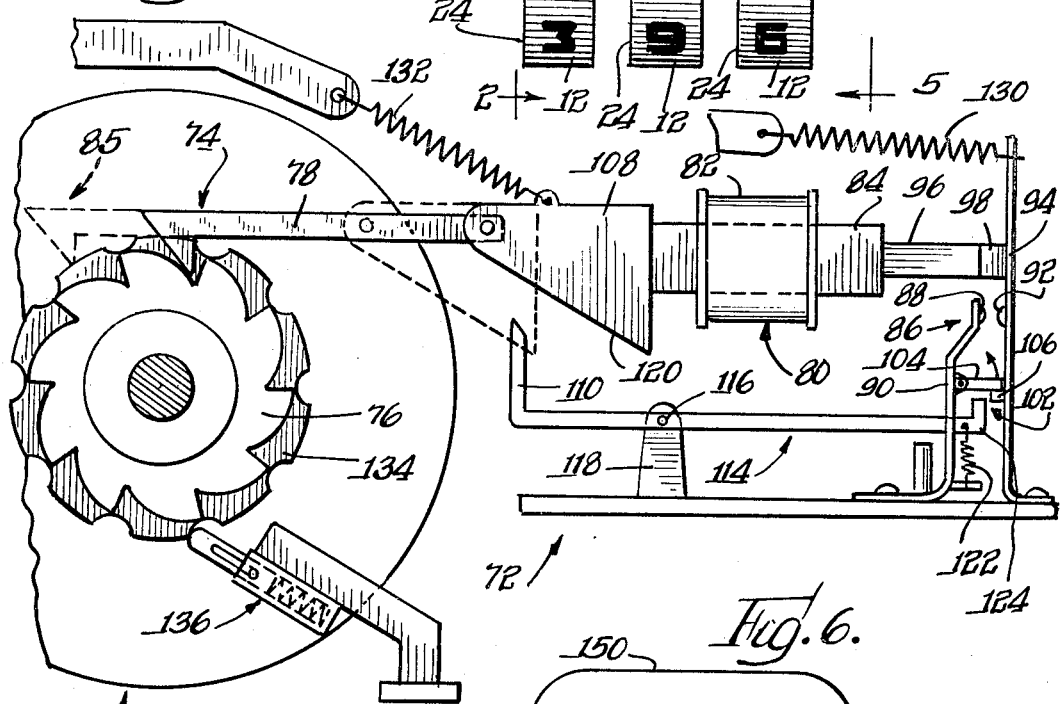
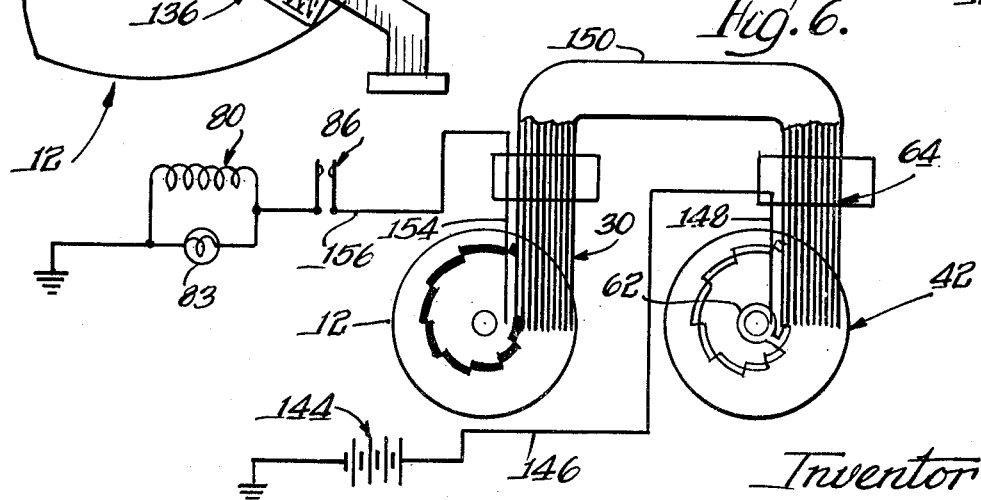
Inventor
Robert W. Sebastian
By: Olson, Trexler, Wolters & Bushnell attys.

Feb. 3, 1970  R. W. SEBASTIAN  3,493,830
SEEKING SWITCH SERVOCONTROL INCLUDING A UNIQUE COMMUTATOR
Filed May 3, 1967  2 Sheets-Sheet 2
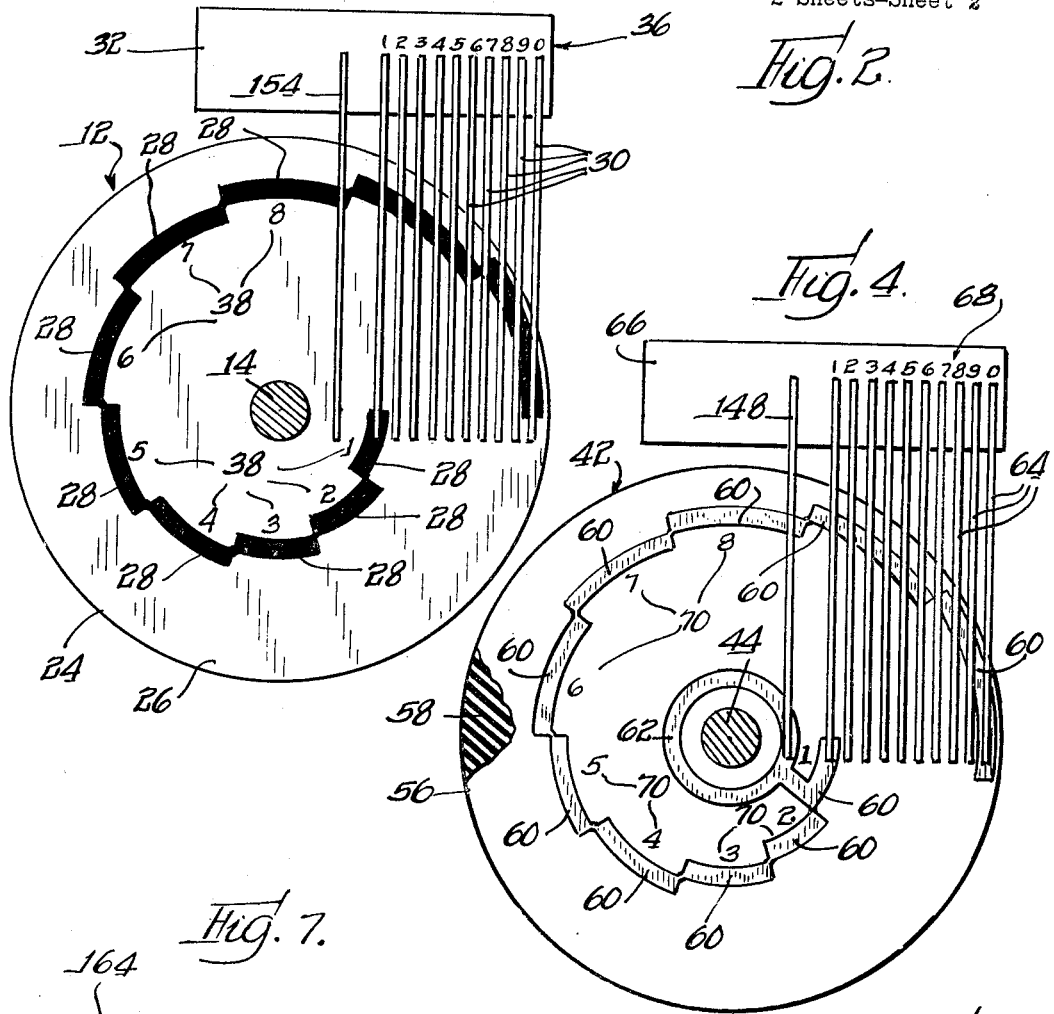
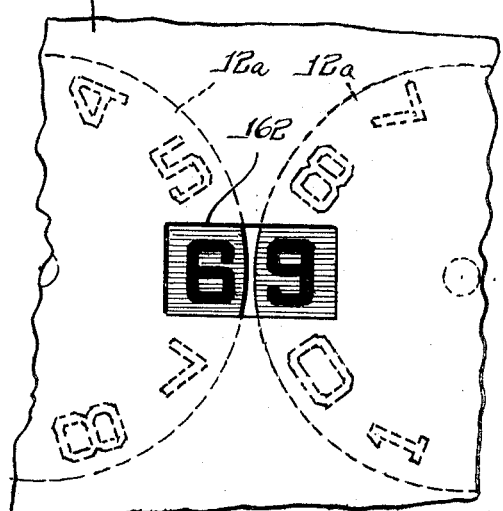
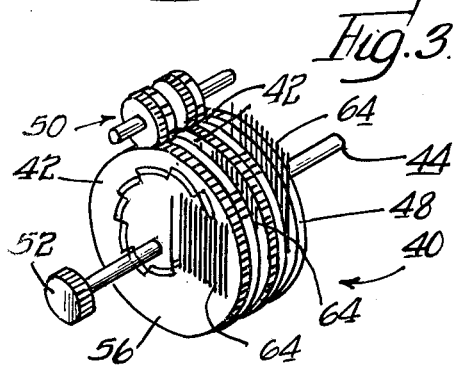
Inventor
Robert W. Sebastian
By: Olson, Trexler, Wolters & Bushnell attys.

United States Patent Office 3,493,830
Patented Feb. 3, 1970

3,493,830
SEEKING SWITCH SERVOCONTROL INCLUDING A UNIQUE COMMUTATOR
Robert W. Sebastian, Villa Park, Ill., assignor to Molex Products Company, Downers Grove, Ill., a corporation of Illinois
Filed May 3, 1967, Ser. No. 635,783
Int. Cl. G05b 5/00
U.S. Cl. 318—33     3 Claims

ABSTRACT OF THE DISCLOSURE

This invention relates to a readout device including an open circuit seeking drum or disc having indicia thereon and which will ratchet one step at a time until an open circuit is found. The readout device can be operated by a contact representing each segment of a rotating commutator on the drum or disc. As long as a voltage is applied to a contact finger and common through a stepping solenoid mechanism the drum or disc will rotate until an insulated segment is brought under the finger. The insulated segment is located in predetermined relation to a numeral or other suitable indicium on the face of the drum or disc. The commutator is directly attached to the drum or disc and preferably comprises a printed circuit thereon.

---

Many different types of readout devices are commonly used with prior art mechanisms. These readout devices provide an indication at the readout location which may indicate the relative position of a component of the mechanism which is spaced apart from the readout location, or a computer setting or answer, etc. Some of the prior art readout devices are quite accurate and highly responsive to input signals. However, these prior art readout devices are complex and expensive to manufacture. In addition, the complex nature of prior art readout devices makes them susceptible to failure during operation. Typically, prior art devices employ large numbers of lamps or lamp components, and failure of one part can result in a false reading, the falsity of which cannot be detected visually.

Therefore, it is an object of this invention to provide a readout device which overcomes the aforementioned shortcomings of prior art constructions.

It is an object of this invention to provide an inexpensive readout device which is relatively simple in construction and trouble-free in operation.

Specifically, it is an object of this invention or disc to provide a readout device having numbers or other indicia on a rotary drum or disc.

Furthermore, it is an object of the present invention to provide such a readout drum or disc having a printed circuit commutator directly thereon.

In addition, it is an object of this invention to provide a readout device having an indicia-bearing drum or disc and associated commutator device driven to seek an open circuit position.

These and other objects and features of the invention will become more apparent upon a reading of the following detailed description, taken in connection with the accompanying drawings, wherein:

FIG. 1 is a plan view illustrating an output or readout assembly forming a preferred embodiment of the invention;

FIG. 2 is an enlarged illustrational view, taken along the line 2—2 of FIG. 1, illustrating an output or counter wheel or disc of the readout assembly;

FIG. 3 is an perspective view, on a reduced scale, of an input assembly used in connection with the readout assembly of FIG. 1;

FIG. 4 is an elevational view of an input dial or disc of the input assembly of FIG. 3;

FIG. 5 is a somewhat schematic enlarged elevational view, taken along the line 5—5 of FIG. 1, illustrating a drive mechanism for the output wheel of FIG. 1;

FIG. 6 is a schematic illustration of electrical circuitry used in connection with the input assembly of FIG. 3 and the output assembly of FIG. 1; and FIG. 7 is a fragmentary plan or elevational view showing a modification in which the indicia appear on the face of a disc, rather than on the surface of a drum.

Referring now to the drawings in greater detail, an output or readout assembly 10 is shown in FIG. 1. The output assembly 10 includes a plurality of output members or indicator wheels or discs 12 mounted for rotation on a central axle or shaft 14. The output members 12 are cylindrical in shape and have a circumferential cylindrical flange or surface 16 on which suitable indicia or numerals 18 are formed or printed. A window or aperture 20 is provided for viewing the indicia 18 which indicates the position of the output members 12 relative to the window.

As is perhaps best seen in FIG. 2, taken in connection with FIG. 1, each of the output members or discs 12 includes a radially extending side surface 24 formed by a body or layer 26 of electrically conductive material, such as copper. A plurality of radially offset arcuate sections or segments 28 of an electrically insulating material are mounted in the body or layer of electrically conductive material 26, thus forming a commutator. In a preferred embodiment of the invention, the body 26 of electrically conductive material and the sections 28 of electrically insulating material are formed in much the same manner in which printed circuits are commonly manufactured.

A plurality of brushes illustrated as spaced apart parallel elongated contact arms or fingers 30 are fixedly insulatedly mounted at a first or fixed end on a frame member 32 and have a second or contact end portion in engagement with the circular side surface 24 of the output member 12 (see FIG. 1, also). The contact fingers 30 are positioned so that the contact end portion of each finger engages only one of the segments 28 when the associated output member is rotated on the shaft 14. The contact fingers 30 are associated with indicia or numerals 16 on the circumferential flange 16 of the output members 12, as indicated by indicia 36 on the frame member 32. It should be noted that each of the sections 28 of insulating material are effectively associated with the indicia 18 on the output members 12 by their association with the contact fingers 30. The association between the sections 28 and the indicia 18 is indicated by indicia 38 which has been added to FIG. 2 for purposes of clarity of illustration. Thus, the contact fingers 30 act as sensor means for sensing the relative position of the output members 12.

Input signals can be provided from a computer, from a machine, or from almost any source. One such source, by way of illustration, includes an input assembly 40, which is best seen in FIG. 3, connected to the output assembly 10 by electrical circuitry. The input assembly 40 includes a plurality of input discs or wheels 42 which are mounted on a central shaft or axle 44. A units or ones input member 48 is connected to the shaft for rotation with the shaft while the remaining input members are mounted for rotation relative to the shaft 44. The units input member 44 may be connected to the remaining input members 42 by a pinion type tens transfer assembly 50. The shaft 44 is turned by a suitable drive, for example a knob 52, to rotate the units input member 48 and the associated tens and hundreds input members. Thus, the input members 42 may act effectively in a known manner as a counter assembly for counting the revolutions of the shaft 44 in either a clockwise or a counterclockwise direction. Alternatively, the input discs or wheels 42 may be manually set independently in any suitable manner.

Each of the input members 42 has a radially extending circular side surface 56 which is best seen in FIG. 4. The side surface 56 is similar in appearance to the side surface 26 of the output members 12. However, the side surface 56 of an input member 42 is formed by a generally circular layer or body 58 of electrically insulating material in which arcuate radially offset segments or sections 60 of an electrically conductive material are mounted. The sections 60 of electrically conductive material are interconnected with each other to provide a continuous path between a radially innermost section 60 and a radially outermost section. The sections 60 are connected to a common or power ring or section 62. A plurality of elongated metallic contact arms or fingers 64 are mounted with a first or fixed end portion connected to a frame member 66 and a second or contact end portion in engagement with the side surface 56 of the input member 42. It should be noted that the contact fingers 64 are spaced apart relative to each other so that each contact finger will engage one and only one of the radially offset sections 60 of electrically conductive material when the input member 42 is rotated. The contact fingers 64 and sections 60 are associated with positions of the input member 42 as indicated by indicia 68 on the frame 66 adjacent to the contact fingers 64 and by indicia 70 which has been added to FIG. 4 for purposes of clarity of illustration. If desired, suitable indicia, corresponding to the indicia 68 and 70, can be formed on a circumferential flange of the input member 42 in much the same manner as in which the indicia 16 is formed on the circumferential flange of the output members 12. Thus, the contact fingers 64 sensibly engage the input member to electrically sense the relative position of the input member. The contact fingers 64 of the input assembly 40 are connected by electrical leads to numerically corresponding contact fingers 30 of the input assembly 16. Thus, the contact finger 64 (see FIG. 4) designated by the numeral 1 of the indicia 68 and associated with the radially innermost section 60 of conductive material designated by the numeral 1 of the indicia 70 is electrically connected to the contact finger 30 (see FIG. 2) designated by the numeral 1 of the indicia 36 and associated with the radially innermost section 28 of electrically insulating material designated by the numeral 1 of the indicia 38. In much the same manner, the remaining contact fingers 64 of the input assembly 40 are connected to numerically corresponding contact fingers 30 of the output assembly 10. In view of this relationship, the input assembly 40 and the output assembly 10 are interconnected by the power ring 62, the electrically conductive sections 60, the contact fingers 64 associated with the sections 60, the contact fingers 30 and the body of electrically conductive material 26.

The relative position of an input member 42 is indicated or sensed by the engagement of a particular section 60 of electrically conductive material with a particular contact 64. Thus, when the input member 42 is positioned in a first position, the radially innermost section 60 is in engagement with the contact finger 64 designated by the numeral 1 of the indicia 68. If the input member 42 is moved to a second position, the contact finger 64 designated by the numeral 2 of the indicia 68 is positioned in engagement with the next radially outward section of electrically conductive material 60 which is designated by the numeral 2 of the indicia 70. In much the same manner, the position of an output member 12 is indicated or sensed by the engagement of the sections 28 of electrically insulating material with the contact fingers 30 so that when the output member 12 is in a first position, the contact finger 30 designated by the numeral 1 of the indicia 36 is in engagement with a radially innermost section 28 of insulating material. As the output member 12 is rotated through the second and third positions, the contact fingers designated by the numerals 2 and 3 sequentially engage the next two radially outward sections of insulating material. Also, the indicia 18 on the circumferential flange 16 visually indicates at the window 20 the relative position of the output members 12.

Each of the output members 12 is associated with a drive assembly 72 which is best seen somewhat schematically in FIG. 5. Preferably the drive assembly 72 is mounted within the drum or cylindrical flange or surface 16. However, for illustrative purposes, this has been shown laid-out in simplified form. The drive assembly 72 includes a ratchet drive mechanism or assembly 74. The ratchet drive mechanism 74 includes a toothed, generally circular ratchet wheel or gear 76 which is mounted on a side of the output members 12, as shown in FIG. 1. The ratchet wheel is engaged by a ratchet pawl 78 to rotate the output member 12 clockwise (as viewed in FIG. 5) in arcuate steps of 36 degrees to sequentially move the indicia 18 (see FIG. 1) past the window 20.

The ratchet pawl 78 is oscillated back and forth by a solenoid or electromagnet means 80 to step the output member 12. A light 83, for example a red light, is electrically connected across the solenoid 80 and is physically disposed adjacent the readout window to indicate, when it flashes, that the reading appearing is not yet final. The solenoid or electromagnet means 80 includes a coil 82 and a core or plunger member 84. The ratchet pawl 78 is connected to an inner end portion of the plunger member 84 and is moved from an initial or normal position, indicated at 85 in dashed lines in FIG. 5, to an actuated or operated position, shown in solid lines in FIG. 5, when the solenoid 80 is energized. A normally closed switch assembly 86 is opened to interrupt an electrical circuit for energizing the solenoid 80 when the ratchet pawl 78 and plunger 84 are in the operated position. The switch assembly 86 includes a fixed contact 88 mounted on a fixed arm or post 90 and a movable contact 92 mounted on a switch arm or spring post 94. The normally closed switch assembly 86 is opened by engagement of an extension or operating arm 96 of the solenoid core 86 with a bumper 98 of electrically insulating material on the switch arm 94. When the ratchet pawl 78 returns to its normal position, indicated in dashed lines at 85 in FIG. 5, the operating arm 96 moves out of engagement with the bumper 98 and the switch assembly 86 is closed.

A latch assembly 102 is provided for holding the switch assembly 86 in the open position illustrated in FIG. 5 until the pawl 78 and plunger 84 are in the initial position indicated by dashed lines at 85 in FIG. 5. The latch assembly 102 includes a pivotally mounted latch member 104 which is moved under the influence of gravity into engagement with a stop or positioning member 106 when the switch assembly 86 is opened. A cam 108 is mounted on the ratchet pawl 78 for movement contemporaneously with the ratchet pawl 78. The cam 108 engages a follower end portion 110 of a latch release lever or rocker arm 114 to pivot the latch or rocker arm about a pivot point or pin 116 on a mounting post 118. The cam 108 pivots the latch release lever 114 by engagement of a cam surface 120 with the follower portion 110 of the latch release lever 114 to move the latch release lever 114 against a return spring 122. This pivoting movement causes an operating end portion 124 of the latch release lever to engage the latch member 104 and pivot the latch member 104 out of engagement with the switch arm 94 to enable the switch assembly 86 to move to the closed position under the urging or biasing of a return spring 130. The cam 108 and pawl 78 are urged toward the normal position, indicated by dashed lines at 85 in FIG. 5, by a return spring 132.

A detent wheel 134 is mounted axially inwardly of the ratchet wheel 76 and is engaged by a detent 136. The detent 136 retains or holds the output members 12 with indicia 18 indexed for viewing through the window 20, The detent 136 also prevents the output member 12 from rotating in a counterclockwise direction when the ratchet pawl 78 is moved from the operating position to the normal position.

A schematic illustration of circuitry used in association with the input assembly 40, the output assembly 10 and the drive assembly 72 is shown in FIG. 6. The circuitry includes a source of power, such as a battery 144, which is connected by a lead line 146 and a common finger 148 (see FIG. 4 also) which engages the power ring 62 of the input member 42. Electrical energy from the battery 144 is conducted from the power ring 62 (FIGS. 4 and 6) to the sections 60 of electrically conductive material. At all times, one and only one of the plurality of contact fingers 64 will be in engagement with one of the plurality of sections 60 of electrically conductive material. A plurality of leads 150 connect contact fingers 64 to the associated contact fingers 30 (see FIG. 6 taken in connection with FIGS. 2 and 4). A common finger or contact 154 engages the body 26 of electrically conductive material on the output member 12. The common contact finger 154 is connected by a lead 156 to the switch assembly 86 and the coil 82 of the solenoid 80.

The solenoid coil 82 is energized by electrical energy conuducted from a section 60 of electrically conductive material and the contact finger 64 associated with the position of the input member 42, one of the plurality of leads 150, a contact member 30 associated with the contact finger 64 and the body 26 of the electrically conductive material. Energization of the solenoid 80 indexes the output member 12 one step for position and opens the switch assembly 86 to deenergize the solenoid 80 and return the ratchet pawl 78 to its initial position. The switch assembly 86 is then returned to its normal or closed position to complete a circuit for reenergizing the solenoid 80 to index the output member 12 another step. This stepwise movement of the output member 12 continues until a section 28 of the insulating material is brought into engagement with the contact finger 30 corresponding to the position of the input member 42. The section 28 of insulating material interrupts or breaks the circuit to prevent further energization of the solenoid 80 and stepping of the output member 12. In this manner, the output members 12 are automatically indexed to a position corresponding to the sensed position of the input members 42. When the position of the output member 12 corresponds to the sensed position of the input member 42 a circuit is interrupted by sections of insulating material onto the output members to distable the drive assembly 72.

In the illustrative embodiment of the invention, input members 42 and output members 12 have been used with ten sections 60 of electrically conductive material and ten sections 28 of electrically insulating material in connection with ten contact fingers 64 and ten contact fingers 30, thus forming a decimal system. It is contemplated that the input members 42 and output members 12 could be used with a binary system of electrically conductive sections and electrically insulating sections. This would reduce the number of fingers and wires to four plus the common, and would require a binary code source.

The construction and operation of the readout device constructed as illustrated in FIGS. 1 through 7 will be largely apparent from the foregoing description. The readout device may operate in conjunction with an input assembly 40 which is connected by circuitry to the readout assembly 10. The input assembly 40 includes a plurality of input members 42 which are movable to a selected or predetermined one of a plurality of positions. Movement of the input members 42 to a selected position will move a section 60 of electrically conductive material which is associated with the selected position of the input member 42 into engagement with a contact finger 64 which is also associated with the selected position of the input member 42. In this manner the contact fingers 64 act as sensors which engage the input member 64 to sense the position of the input member. The contact fingers 64 are connected to contact fingers 30 of the output assembly 10 by leads 150. Electrical energy is conducted from the contact finger 64 which is in engagement with the section 60 of electrically conductive material corresponding to the position of the output member 42 to contact the finger 30 which is also associated with the position of the input member 42. The electrical energy is conducted from the contact 30 which is associated with the position of the input member 42 to the common finger 154 by the body 26 of electrically conductive material. This conduction of electrical energy between the common contact finger 154 and the contact finger 30 associated with the position of the input member 42 is maintained until the output member 12 is indexed to a position in which a section 28 of insulating material is in engagement with the contact finger 30 associated with the position of the input member 42. In this manner, the contact fingers 30 act as sensors which engage the output member 12 for sensing when the output member is in a position corresponding to the position of the input member 42. The circuit for energizing the drive 72 is then interrupted and the rotation of the output member 12 halted. Of course, the input member 42 and output member 12 are in the same relative positions when the rotation of the output member 12 is halted.

The drive assembly 72 includes a ratchet drive mechanism 74 for indexing the output member 12 in unit steps of 36 degrees. Each time the output member 12 is stepped or indexed, a switch assembly 86 is opened and maintained in the open position until the ratchet drive mechanism 74 returns to its initial position. When the ratchet drive mechanism 74 returns to its initial position, the switch assembly 86 is closed and the solenoid 80 reenergized to move the output member 12 for another step. This stepping of the output member 12 continues until a section 28 of insulating material is moved into engagement with an associated contact finger 30 which corresponds to the position of the input member 42. The engagement of the section 28 of insulating material with the contact finger 30 associated with the position of the input member 42 automatically interrupts the circuit for energizing the solenoid 80 of the drive assembly 72 to halt the rotation of the output member 12.

It is contemplated that drive assemblies, other than the one shown, or other signal sources will be used for indexing the output members 12.

A modification of the present invention is fragmentarily illustrated in FIG. 7. In this modification the indicia are placed on the faces of the discs 12a opposite to the commutator faces. The disc axes are offset and the discs lie in coplanar, nearly abutting relation. Cooperating numbers or other indicia are read side-by-side through a window 162 in an overlying cover or panel 164. With the numbers in the order indicated, the two discs shown ratchet in relatively opposite directions. Although in the preferred embodiment of the invention the sections of insulating and conductive material are formed on bodies of conductive and insulating material, respectively, it is contemplated that the output members 12 and input members 42 could be formed of sections or segments of insulating and conductive material in many different ways. It is also contemplated that the input members 42 and output members 12 can have many different shapes than the one shown. Therefore, while particular embodiments of the invention have been shown, it should be understood, of course, that the invention is not limited thereto since many modifications may be made; and it is contemplated to cover by the appended claims any such modifications as fall within the true spirit and scope of the invention.

What is claimed is:

1. An assembly comprising: an input member selectively rotatable to a plurality of input positions and comprising a disc-like body of electrically insulating material which a plurality of sections of electrically conductive material on the face thereof corresponding to said plurality of input positions, said sections being arranged in a spiral of increasing radius and electrically contacting one another in succession; first sensor means sensibly engaging said input member for sensing the position of said input member and comprising a plurality of fixed conductive members electrically isolated from one another and engaging the face of said input member, each being engagable with only one of said sections; an output member selectively rotatable to a plurality of output positions corresponding to said plurality of said input positions and comprising a disc-like body of electrically conductive material and a plurality of sections of electrically insulating material on the face thereof in mirror image relation to the conductive material on the face of the input member and respectively corresponding to said plurality of output positions, said insulating material sections being arranged in a spiral of increasing radius with successive insulating sections contacting one another, second sensor means sensibly engaging said output member for sensing when said output member is in a position corresponding to the position of said input member and comprising a plurality of fixed conductive members electrically isolated with one another and engaging the face of said output member and each being engagable with only one of said electrically insulating material sections; electric circuitry respectively interconnecting the members of said first and second sensor means; and drive means connected to said output member for automatically moving said output member until the sensing position of said output member corresponds to the sensed position of said input member.

2. An assembly as set forth in claim 1 wherein the spirally arranged sections on the input and output members comprise arcuate segments, each segment being of a uniform radius and of increased radius relative to the preceding segment.

3. An assembly as set forth in claim 1 wherein the conductive members of each sensor means are disposed in lateral alignment.

References Cited

UNITED STATES PATENTS

| | | | |
|---|---|---|---|
| 811,539 | 2/1906 | Bates | 318—33 |
| 2,200,680 | 5/1940 | Ramos | 318—33 |
| 2,238,475 | 4/1941 | Mitchell | 318—33 |
| 2,447,520 | 8/1948 | McGill et al. | 318—33 X |
| 2,449,178 | 9/1948 | Sansbury | 318—33 X |
| 2,848,677 | 8/1958 | Stockwell. | |
| 2,959,773 | 11/1960 | Marsh | 318—33 X |
| 3,192,656 | 7/1965 | Christensen | 318—467 X |
| 3,406,322 | 10/1968 | De Dube | 318—33 |

THOMAS E. LYNCH, Primary Examiner

U.S. Cl. X.R.

318—467